June 25, 1957 E. J. GARGINI 2,797,358

OPERATING CIRCUITS FOR CATHODE RAY TUBES, ESPECIALLY IN TELEVISION RECEIVERS

Filed April 29, 1953

Inventor

ERIC JOHN GARGINI

By [signature]

Attorneys

United States Patent Office 2,797,358

Patented June 25, 1957

2,797,358

OPERATING CIRCUITS FOR CATHODE RAY TUBES, ESPECIALLY IN TELEVISION RECEIVERS

Eric John Gargini, Yiewsley, West Drayton, England, assignor to Electric & Musical Industries Limited, Middlesex, England, a company of Great Britain Application April 29, 1953, Serial No. 352,004

Claims priority, application Great Britain May 3, 1952

3 Claims. (Cl. 315—27)

Figures 1, 2:
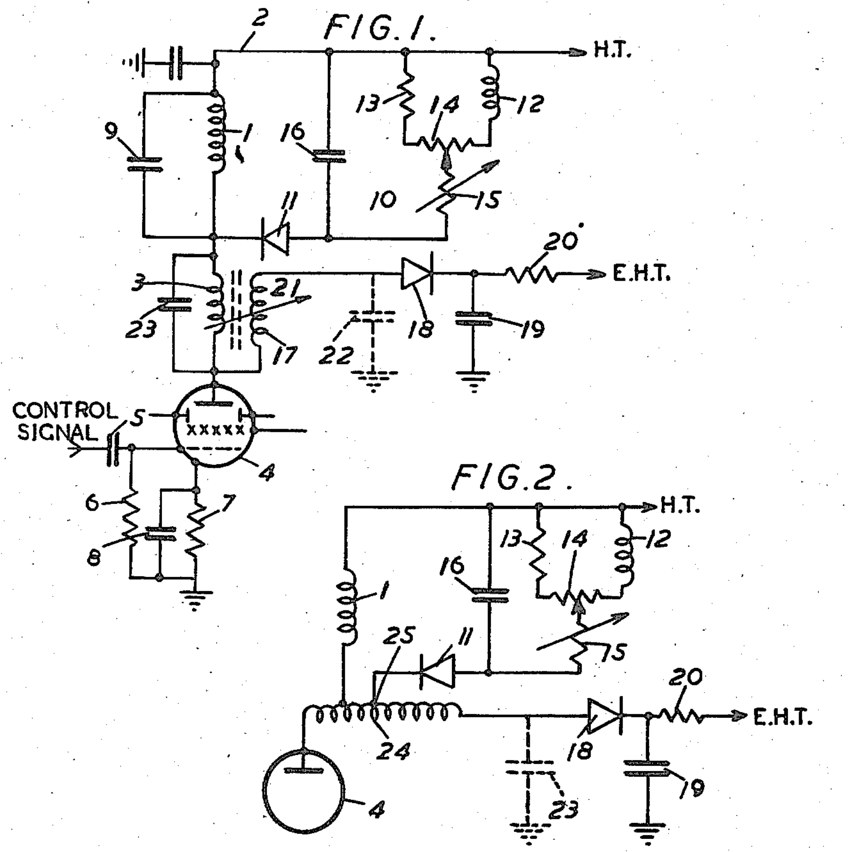

This invention relates to operating circuits for cathode ray tubes, especially but not exclusively in television receivers.

In television receivers it is usual to employ magnetic deflection of the beam of the cathode ray tube, the deflection being effected by causing current variations of sawtooth waveforms to flow in line and frame scanning coils. So called resonant return scanning circuits are frequently used and in one form of resonant return scanning circuit, which is known as a direct drive circuit, the scanning coil is connected without an intermediate transformer in the anode circuit of the driver valve which is employed to maintain a current of sawtooth waveform in said coil, a damping diode in series with a storage capacitor being connected across the coil in conventional manner. In circuits of this form an additional inductance is often introduced between the scanning coil and the anode of the driver valve to provide an additional source from which energy can be transferred to the storage capacitor during resonant return. In such circuits the additional inductance is substantially undamped by the damping diode when the latter conducts and this gives rise to the disadvantage that the resonant circuit formed by the additional inductance and associated capacity may continue to ring during forward strokes. Moreover, such ringing oscillations may be transferred, by inevitable capacity coupling, to the scanning coil and thereby produce spurious vertical bars on the cathode ray tube screen.

The main object of the present invention is to reduce the disadvantage indicated in the preceding paragraphs in a simple and economical manner.

With this object in view there is provided, according to the present invention, an operating circuit for a cathode ray tube comprising a scanning coil, means including a valve for producing current variations of sawtooth waveform in said coil, a source of anode potential for said valve, a first inductance element, said inductance element and said coil being connected in series in a path connected from the anode of said valve to said source, another path including a second inductance element connected at one end to the anode of said valve, a series combination of a rectifier and a capacitor connected from the other end of said latter path to a point of substantially fixed potential, said rectifier being connected to conduct during return strokes of said variations to charge said capacitor and develop a polarising potential, said second inductance element being tuned to resonance at a predetermined frequency and coupled to said first inductance element to produce substantial cancellation of free oscillations which tend to occur in said scanning coil during the forward strokes of said variations due to resonance of the circuit of said first inductance element.

In a television receiver it is also found that if the high tension supply of the receiver should vary in such a way as to produce an increase in the width of the raster on the cathode ray tube screen, a complementary change in the focus usually occurs and refocussing may be required. This disadvantage can be attributed in many cases to the operation of the line scanning circuit, inasmuch as energy stored in the line scanning coil at the end of each long flank is utilised in part for generating the E. H. T. for application to the second anode of the tube. The amount of energy recovered in and consequently the E. H. T. is susceptible to variations in the width of the raster arising from variations in operating parameters such as the normal H. T. supply. Moreover, it is variations in E. H. T. which are mainly responsible for defocussing of the beam of the cathode ray tube.

Another object of the present invention is to reduce this disadvantage by including a focus adjusting circuit in the line scanning circuit, as will appear from the following description.

In order that the said invention may be clearly understood and readily carried into effect, the same will now be more fully described with reference to the accompanying drawings.

Figure 3:
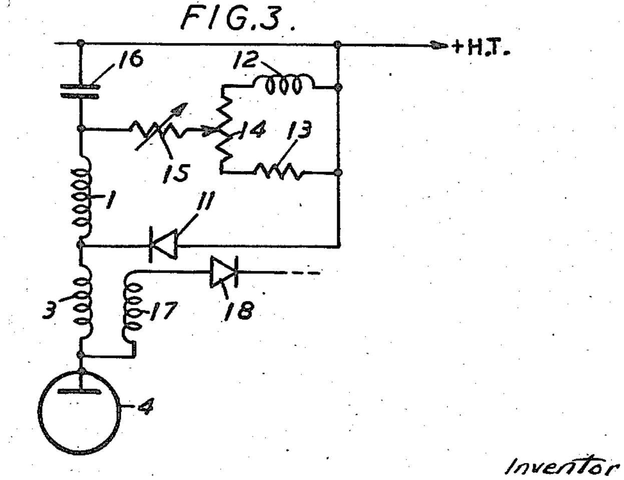

Figure 1 illustrates one example of the present invention applied to a television receiver intended for use in a television relay system, Figure 2 illustrates a modification of Figure 1, and Figure 3 illustrates another modification of Figure 1.

Referring to Figure 1, the part of the television receiver illustrated comprises a line scanning circuit with which is associated a focus adjusting circuit for the cathode ray tube of the receiver and a circuit for generating a high tension which is commonly known as the E. H. T. for the cathode ray tube. Reference numeral 1 indicates the line scanning coil for the cathode ray tube, the coil being connected between the high tension line indicated by the reference numeral 2 and a further coil 3 which is in turn connected to the anode of the amplifying valve 4. The valve 4 has its control electrode coupled to a source of synchronised control signals (not shown) via coupling condenser 5 which has a leak resistance 6. The cathode circuit of the valve 4 includes the parallel combination of a resistance 7 and a condenser 8 which provide bias for the valve. The scanning coil 1 is shunted by a condenser 9 and is associated with an energy-recovering circuit denoted in general by the reference numeral 10. The energy recovering circuit comprises a rectifier 11, which may as desired be a metal rectifier or a diode valve and which has its cathode connected to the end of the coil 1 nearer the anode of the valve 4. The anode circuit of the rectifier 11 comprises a focus coil 12 and a resistance 13 which are connected at their upper ends (in the drawing) to the H. T. line 2 and at their lower ends to opposite ends of a focus control potentiometer 14. The tap on this potentiometer is in turn connected through a variable width-control resistance 15 to the anode of the rectifier 11. The elements 12, 13, 14 and 15 are shunted by a storage condenser 16.

The means for generating the E. H. T. comprises a coil 17 connected at one end of the anode of the valve 4 and at its other end to the anode of a rectifier 18, the cathode of which is connected as shown to the junction of a storage condenser 19 and a feed resistance 20. The coil 17 is coupled with the coil 3 and the coupling is variable in any suitable manner as indicated by the arrow 21. Numeral 22 denotes stray capacity whilst condenser 23 is made up of stray capacity and an additional capacity which tunes the complete E. H. T. circuit to series resonance at a desired frequency.

In so far as the line deflection of the beam of the cathode ray tube is concerned, the circuit described operates in a conventional manner, and a current variation of sawtooth waveform is caused to flow in the coil 1 under the control of the signal applied to the control electrode of the valve 4. This control signal includes periodic negative pulses which render the valve 4 temporarily non-conducting and produce in known manner the short flanks of the current variation. During each short flank the potential at the anode of the valve 4 executes a positive potential excursion of large amplitude and the rectifier 11 is rendered non-conducting. The lower end of the coil 17 follows this positive potential excursion and the sense of the coupling between the coils 3 and 17 is such that an additional rise in potential is produced at the upper end of the coil 17. The rectifier 18 is rendered conducting, switching the condenser 19 in series with the coil 17 whereby the condenser 19 is charged substantially to the potential at the upper terminal of the coil 17. The potential across the condenser 19 is utilised in known manner as the E. H. T. supply for the second anode of the cathode ray tube, the potential being applied to this electrode via the resistance 20.

At the end of the return stroke the potential at the anode of the valve 4 and also at the junction of the coils 1 and 3 tends to swing negatively and the rectifier 11 is rendered conducting and damps the negative potential excursion in the coil 1 in known manner. During the forward stroke the current in the coil 1 at first flows from the lower terminal to the upper terminal via the rectifier 11 whereby energy recovered from the previous forward stroke is utilised. This current diminishes and becomes zero and current then flows in the coil 1 in the opposite direction via the valve 4 and when the circuit is operating under equilibrium conditions a substantially uniform potential difference is maintained across the storage condenser 16 with the upper electrode positive with respect to the lower electrode. Moreover, current flows through the shunt arm including the elements 12, 13, 14 and 15 from the upper end of the arm to the lower end, some of this current being drawn from the H. T. line 2 and some from the condenser 16. The valve 4 is maintained conducting throughout the forward stroke by the control signal and the control signal may be shaped as required in order to ensure linearity of the current waveform in the coil 1. Control of the amount of current which flows in the focus coil 12 can be effected by adjusting the tap of the potentiometer 14 and such adjustment does not affect the current flowing through the coil 1. Moreover, the amplitude of the current waveform in the coil 1 can be controlled by the adjustment of the variable resistance 15 and it is found in practice that such adjustment has no appreciable defocussing effect.

The circuit described is also substantially stable against incidental changes in the operating parameters. For instance assuming that a change in the power supply source gives rise to an increased drive on the valve 4. the amplitude of the current variation in the coil 1 tends to increase. Such increase will, however, result in a greater amount of energy being recovered by the energy recovering circuit 10 and the E. H. T. circuit, whereby the liability for defocussing to occur as a result of the change in the parameters is substantially reduced.

Another advantage of the circuit described is that any tendency which free oscillations induced during the return stroke in the resonant circuit associated with the coil 3 may have to persist during the forward stroke and be injected across the line scanning coil is substantially reduced by virtue of the coupling between the coils 3 and 17. During the forward stroke, similar free oscillations tend to persist in the E. H. T. circuit, and the coupling between the two circuits of the coils 3 and 17 is arranged to be such that free oscillations are effectively mutually cancelling in the coupled circuits.

In the modification illustrated in Figure 2, the coils 3 and 17 are replaced by a single coil 24 which is connected to act as an auto-transformer as shown. Moreover the cathode of the rectifier 11 is connected to a tap 25 on the coil 21. With this arrangement a potential variation is set up during the forward stroke at the tap 25 which has the effect of controlling the current in the rectifier 11 and the tap 25 is so chosen that this potential variation serves to linearise the current waveform in the coil 1. With this arrangement, linearisation by means of the control signal applied to the control electrode of the valve 4 may be dispensed with.

With circuits such as described, the main focussing of the beam of the cathode ray tube may be effected by a permanent magnet. In this case the focus coil 1 merely constitutes an auxiliary focussing means for effecting focus adjustments.

The present invention may also be incorporated in circuits in which some of the energy recovered is employed for boosting the H. T. supply for the scanning waveform output valve 4, by utilising the energy to charge a condenser in the anode or cathode circuit of the valve. This can be achieved for example by including, in the circuits of Figures 1 and 2, a further condenser between the upper terminals of the scanning coils 1 and the condenser 16, so that some of the recovered energy serves to charge this further condenser and produce the H. T. boost, in known manner. Preferably however, the condenser 16 is arranged to serve also the function of the boost condenser and this can be achieved as shown in Figure 3, by connecting the condenser 16 and the focus coil network comprising the elements 12, 13, 14 and 15, between the upper end the coils and the H. T. source.

While the invention has been described as applied to television receiver units intended for use in a television relay system, it will be understood that it can also be applied to conventional television receivers.

What I claim is:

1. An operating circuit for a cathode ray tube comprising a scanning coil for said tube, means for producing a current variation of a sawtooth waveform in said coil, a unilaterally conductive path connected across said coil, said path including a rectifier connected to conduct during part of each cycle of said current variation and a capacitor connected in series with said rectifier to be charged by the current flowing through said rectifier, a focus coil for said cathode ray tube, a resistor, said focus coil and said resistor being each connected at one end to one side of said capacitor, a focus control potentiometer connected from the other end of said focus coil to the other end of said resistor, and a variable resistor for controlling the deflection amplitude produced by said scanning coil and connected from the tap of said potentiometer to the other side of said capacitor.

2. An operating circuit for a cathode ray tube comprising a scanning coil for said tube, means for producing current variations of a sawtooth waveform in said coil, a unilaterally conductive path connected across said coil, said path including a rectifier connected to conduct during the forward strokes of said variations and a capacitor connected in series with said rectifier to be charged by the current flowing through said rectifier, a direct current path connected across said capacitor, said path including a focus coil for said cathode ray tube, a resonant circuit coupled to said scanning coil and including a second rectifier connected to conduct during the return strokes of said variations, said resonant circuit being tuned to a predetermined frequency to produce substantial cancellation of free oscillations which tend to occur in the scanning coil during the forward strokes of said variations, a second capacitor connected in series with said second rectifier to be charged by current passed by said second rectifier, and means for applying the potential set up across said second capacitor to an electrode of said cathode ray tube.

3. An operating circuit for a cathode ray tube comprising a scanning coil, means including a valve for producing current variations of sawtooth waveform in said coil, a source of anode potential for said valve, a first inductance element, said inductance element and said coil being connected in series in a path connected from the anode of said valve to said source, another path including a second inductance element connected at one end to the anode of said valve, a series combination of a rectifier and a capacitor connected from the other end of said latter path to a point of substantially fixed potential, said rectifier being connected to conduct during return strokes of said variations to charge said capacitor and develop a polarising potential, said second inductance element being tuned to resonance at a predetermined frequency and coupled to said first inductance element to produce substantial cancellation of free oscillations which tend to occur in said scanning coil during the forward strokes of said variations due to resonance of the circuit of said first inductance element.

References Cited in the file of this patent

UNITED STATES PATENTS

| | | |
|---|---|---|
| 2,492,674 | Wynn | Dec. 27, 1949 |
| 2,536,838 | Clark | Jan. 2, 1951 |
| 2,555,831 | Tourshou | June 5, 1951 |
| 2,579,014 | Schlesinger | Dec. 18, 1951 |
| 2,588,652 | Nelson | Mar. 11, 1952 |
| 2,588,659 | Pond | Mar. 11, 1952 |